(12) United States Patent
Zhu et al.

(10) Patent No.: US 9,538,436 B2
(45) Date of Patent: Jan. 3, 2017

(54) MITIGATING INTERFERENCE WITH WIRELESS COMMUNICATIONS

(71) Applicant: BLACKBERRY LIMITED, Waterloo (CA)

(72) Inventors: Lizhong Zhu, Waterloo (CA); Khaled Lakhdhar, Waterloo (CA); Michael Peter Montemurro, Toronto (CA); Fei He, Kitchener (CA); Qingmai Zhou, Waterloo (CA); Jun Xu, Scarborough (CA); Dong Wang, Waterloo (CA); Zongyou Zhang, Waterloo (CA); Mohammed Mahdi Hasan, Waterloo (CA); Libo Zhu, Waterloo (CA); Cristian Lambiri, Ottawa (CA); Goran Hageltorn, Ottawa (CA); Yan Wu, Waterloo (CA); Daniel Fischer, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 145 days.

(21) Appl. No.: 14/472,758

(22) Filed: Aug. 29, 2014

(65) Prior Publication Data

US 2016/0066225 A1    Mar. 3, 2016

(51) Int. Cl.
*H04W 4/00* (2009.01)
*H04W 36/00* (2009.01)
*H04W 36/30* (2009.01)

(52) U.S. Cl.
CPC ..... *H04W 36/0094* (2013.01); *H04W 36/0083* (2013.01); *H04W 36/0061* (2013.01); *H04W 36/30* (2013.01)

(58) Field of Classification Search
None
See application file for complete search history.

(56) References Cited

U.S. PATENT DOCUMENTS

| | | | | |
|---|---|---|---|---|
| 8,873,508 B1* | 10/2014 | Oroskar | ............... | H04W 72/04 370/331 |
| 2007/0191013 A1* | 8/2007 | Gunnarsson | .......... | H04W 36/04 455/438 |
| 2010/0317354 A1* | 12/2010 | Kirvar | ................... | H04W 16/18 455/447 |
| 2012/0050331 A1* | 3/2012 | Kanda | ................... | G06F 3/1454 345/649 |

(Continued)

FOREIGN PATENT DOCUMENTS

WO    2005096657    10/2005

OTHER PUBLICATIONS

European Patent Office, Extended European Search Report for EP Appl. No. 15182475.2 dated Dec. 8, 2015 (9 pages).

*Primary Examiner* — Quan M Hua
(74) *Attorney, Agent, or Firm* — Trop Pruner & Hu, P.C.

(57) ABSTRACT

An electronic device monitors a quality of a wireless connection between the electronic device and a first access point. Based on the monitoring and a collection of parameters relating to controlling handover between access points, a determination is made regarding whether the electronic device should be handed over to a second access point from the first access point, where the parameters differ for different combinations of the first access point and candidate destination access points for handover of the electronic device from the first access point.

17 Claims, 2 Drawing Sheets

(56) References Cited

U.S. PATENT DOCUMENTS

2014/0226620 A1 8/2014 Zhou et al.
2016/0183154 A1* 6/2016 Van Der Velde . H04W 36/0083
370/331

* cited by examiner

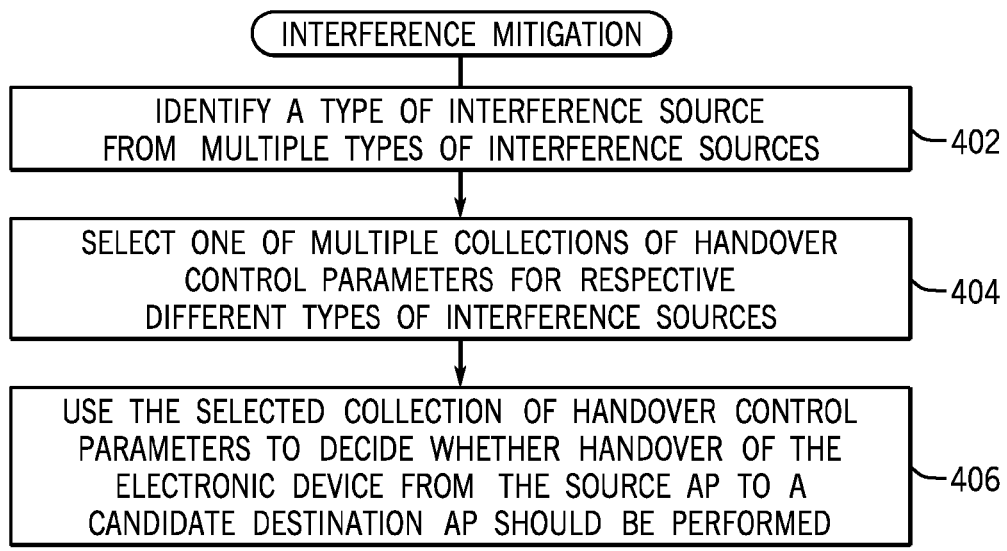
FIG. 3
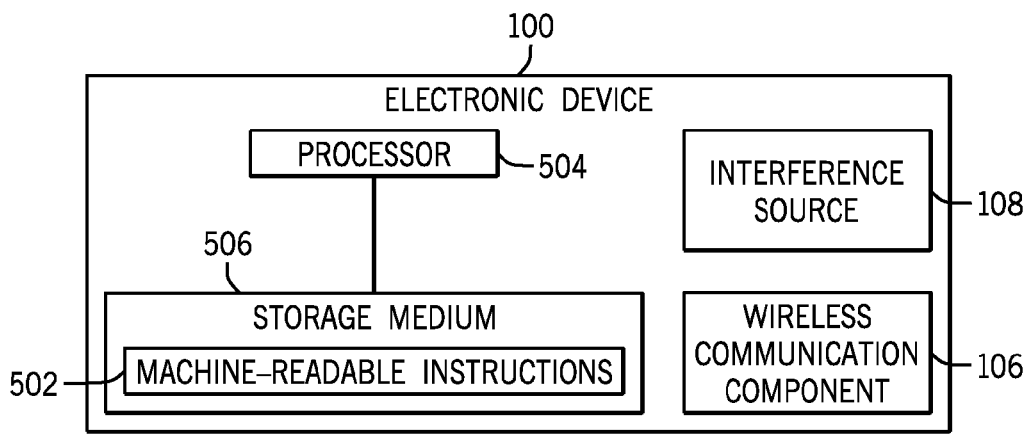
FIG. 4
FIG. 5

MITIGATING INTERFERENCE WITH WIRELESS COMMUNICATIONS

BACKGROUND

An electronic device can include a wireless communication component to allow the electronic device to communicate wirelessly. In some cases, an electronic device can include multiple wireless communication components, such as multiple radio frequency (RF) transceivers. The presence of multiple wireless communication components can result in interference between the wireless communication components, which can lead to reduced reliability in wireless communications.

BRIEF DESCRIPTION OF THE DRAWINGS

Some implementations are described with respect to the following figures.

FIG. 3 illustrates an example table of handover control parameters used for deciding whether to hand over between access points, in accordance with some implementations.

FIG. 4 is a flow diagram of another example interference mitigation process according to further implementations.

FIG. 5 is a block diagram of an example electronic device, according to further implementations.

DETAILED DESCRIPTION

Figure 1:
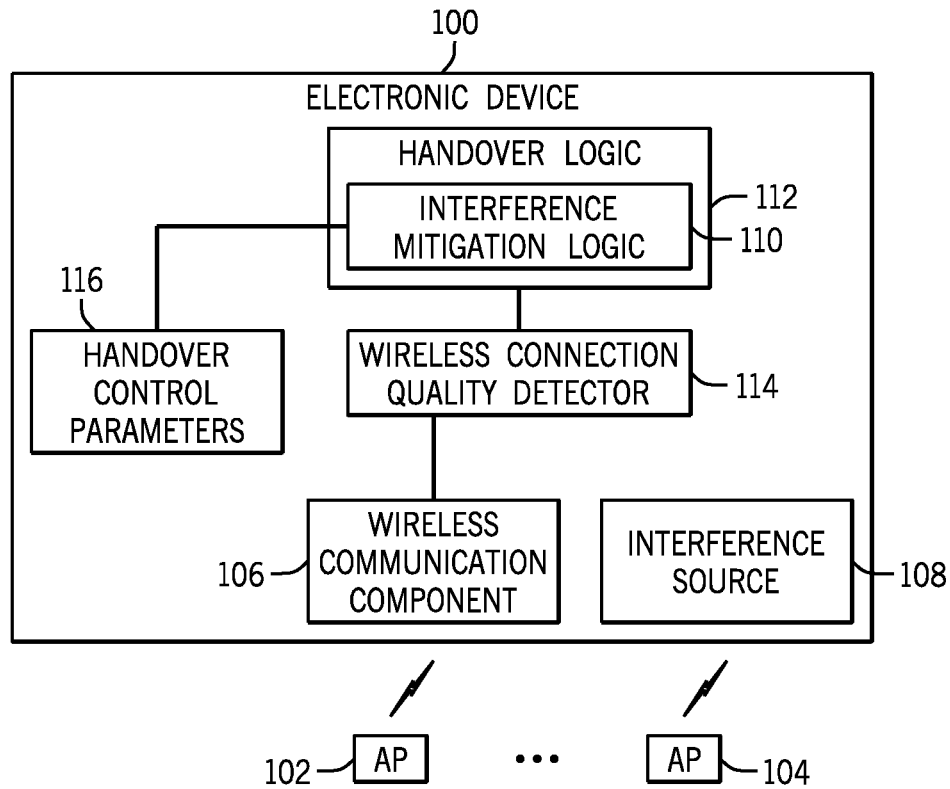
FIG. 1 is a block diagram of an example electronic device that includes multiple wireless communication components and an interference mitigation logic, according to some implementations.

FIG. 1 is a block diagram of an example arrangement that includes an electronic device 100 and multiple access points (APs) 102, 104. Examples of the electronic device 100 can include a computer (e.g. desktop computer, notebook computer, tablet computer, etc.), a mobile phone, a personal digital assistant, a game appliance, and so forth.

The electronic device 100 includes a wireless communication component 106 that is able to establish wireless connections with any one or more of the APs 102, 104. Although just two APs 102, 104 are depicted in FIG. 1, it is noted that in other examples, more APs 102, 104 can be provided. Establishing a wireless connection with an AP can refer to setting up or otherwise providing resources associated with the AP that are used to carry control and data traffic between a UE and the AP.

The electronic device 100 can also include an interference source 108 that can interfere with wireless communications of the wireless communication component 106. The interference source 108 can be another wireless communication component that is able to communicate wirelessly. In other examples, the interference source 108 can be a non-wireless communication component.

As further examples, although the interference source 108 is shown as being part of the electronic device 100, it is possible that interference with the wireless communication component 106 can be caused by an interference source that is external of the electronic device 100. For example, the interference source can be a nearby microwave oven, a transmitted signal from another electronic device, and so forth.

As examples, the wireless communication component 106 can include a radio frequency (RF) transceiver to perform RF communications. One type of RF transceiver is a wireless local area network (WLAN) transceiver, such as a WLAN transceiver that operates according to the Institute of Electrical and Electronics Engineers (IEEE) 802.11 protocol. The interference source 108 can include another RF transceiver, such as a Bluetooth transceiver, a Global Positioning System (GPS) transceiver, an RF transceiver for performing communication of wireless high-definition audio and video signals, an RF transceiver for communicating with a mobile cellular network, a frequency modulation (FM) radio transceiver, and so forth. Note that there can be multiple interference sources 108 in the electronic device 100, although just one interference source 108 is shown. An example of a mobile cellular RF transceiver includes an RF transceiver for performing Long-Term Evolution (LTE) communications, as defined by Third Generation Partnership Project (3GPP) standards. In other examples, other mobile cellular RF transceivers can be employed.

In other examples, the interference source 108 can be a non-wireless interference source. For example, the interference source 108 can include a communication component for performing wired communications, such as according to the High-Definition Multimedia Interface (HDMI) protocol.

The presence of an internal and/or external interference source can cause desense of the wireless communication component 106. Desense of the wireless communication component 106 can refer to a degradation in sensitivity of the wireless communication component 106 for wireless communications, which can lead to increased error rates or service interruption.

To address desense of the wireless communication component 106 due to presence of an interference source, the electronic device 100 includes interference mitigation logic 110, which is shown as being part of handover logic 112 in the example of FIG. 1. The interference mitigation logic 110 responds to detected interference with the wireless communication component by triggering an action to reduce the detected interference. The handover logic 112 controls handover of the electronic device 100 between the APs 102 and 104. Handing over the electronic device 100 from a first AP to a second AP refers to causing the electronic device 100 to transition from communicating over a wireless connection with the first AP to communicating over a wireless connection with the second AP. An action that can be triggered by the interference mitigation logic 110 is handover of the electronic device 100 between APs when interference is detected, to mitigate an effect of the interference. In a WLAN, handover of the electronic device 100 can refer to performing a basic service set (BSS) transition of an electronic device between WLAN APs.

The different APs can be associated with different communication channels, which can be distinguished by different frequencies, or different time slots, or different codes, or some combination of the foregoing. Different APs can refer to different physical APs that are located at geographically separate locations. In other examples, different APs can refer to different logical APs, where two or more of the logical APs can reside at a common physical platform.

The electronic device 100 also includes a wireless connection quality detector 114, which is able to monitor the equality of wireless communications performed by the wireless communication component 106. In addition, the electronic device 100 stores various handover control parameters 116, which are used by the interference mitigation logic 110 to determine whether handover of the electronic device 100 between APs is to be performed due to desense of the wireless communication component 106.

The handover logic 112, interference mitigation logic 110, and wireless connection quality detector 114 can be implemented with hardware circuitry, or as a combination of machine-readable instructions and hardware processing circuitry.

The wireless connection quality detector 114 is able to monitor the quality of both uplink and downlink communications between the electronic device 100 and an AP to which the electronic device 100 is currently connected. The AP to which the electronic device 100 is currently connected can be referred to as a "source AP," from which the electronic device 100 can be handed over to another AP ("destination AP") for interference mitigation.

In some examples, monitoring the quality of a downlink (that carries signals from the source AP to the electronic device 100) can be based on monitoring a received signal strength indicator (RSSI) transmitted by the source AP. RSSI is a measurement of the power present in a received radio signal. In some examples, the higher the RSSI value, the stronger the received radio signal. In other examples, other indicators of the quality of downlink communications can be employed, such as a detected data rate over the downlink, or some other indicator.

An example of the quality of an uplink that can be monitored includes an indicator of a retry rate in the uplink. The retry rate refers to a number of retries performed by the wireless communication component 106 on the uplink within a certain time interval. A "retry" can refer to retransmission of data (control data or bearer traffic data) due to corruption of the data or inability of a receiver to successfully receive the data. In other examples, other indicators of the quality of the uplink can be employed, such as a data rate of the uplink.

Information relating to the monitored quality of the wireless connection (uplink or downlink or both) is provided by the wireless connection quality detector 114 to the interference mitigation logic 110. Based on the monitored quality of the wireless connection, the interference mitigation logic 110 can decide whether or not to perform a handover of the electronic device 100 from the source AP to a destination AP that is different from the source AP. As noted above, the source AP and the destination AP can include different physical APs, or different logical APs. Handing over the electronic device 100 from the source AP to the destination AP can also refer to causing the electronic device 100 to transition from one communication channel to another communication channel.

Figure 2:
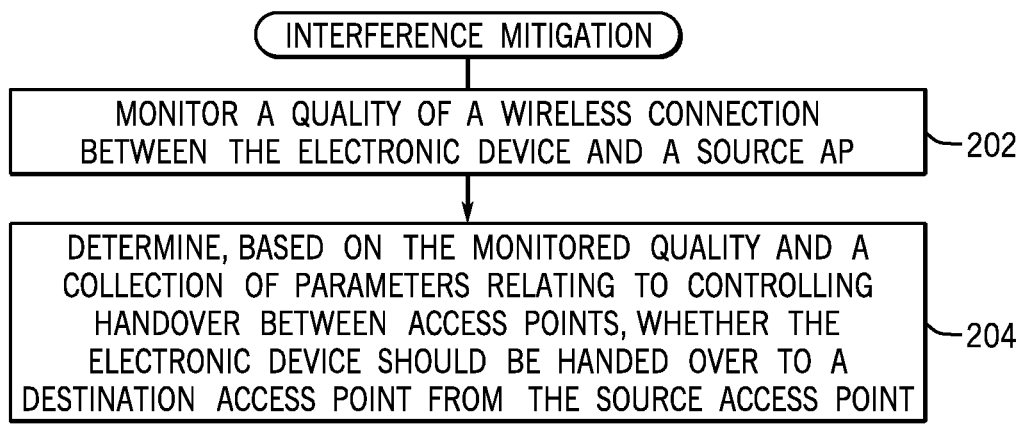
FIG. 2 is a flow diagram of an example interference mitigation process according to some implementations.

FIG. 2 is an example process of mitigating interference with wireless communications that can be performed by the electronic device 100. The wireless connection quality detector 114 monitors (at 202) a quality of a wireless connection between the electronic device 100 and a source AP. The interference mitigation logic 110 determines (at 204), based on the monitored quality of the wireless connection and a collection of parameters relating to controlling handover between APs (e.g. handover control parameters 116 shown in FIG. 1), whether the electronic device 100 should be handed over from the source AP to a destination AP.

In some implementations, the handover control parameters 116 differ for different combinations of the source AP and candidate destination APs to which the electronic device 100 can potentially be handed over from the source AP. Stated differently, the handover control parameters 116 used for controlling handover between the source AP and a first candidate destination AP (a first combination of APs) can differ in value(s) from handover control parameters used for controlling handover between the source AP and a second candidate destination AP (a second, different combination of APs).

When the quality indication provided by the wireless connection quality detector 114 indicates that the quality of a specific wireless connection (downlink or uplink or both) has dropped below a specified threshold, the interference mitigation logic 110 can make the determination of whether or not to perform handover of the electronic device 100 between APs. The specified threshold can be one of the handover control parameters 116 discussed above. As examples, if the received RSSI dropped below a specified RSSI threshold, or a retry rate exceeds a retry rate threshold, or a detected data rate drops below a data rate threshold, then that is an indication that the wireless connection is exhibiting low quality due to desense of the wireless communication component 106.

In the ensuing discussion, it is assumed that the quality indication provided by the wireless connection quality detector 114 is an RSSI value. Similar techniques can be applied to other types of quality indications.

If a detected RSSI drops below a threshold (L), which can be expressed in dBm (decibel-milliwatts), then a determination of whether handover is to be performed from the source AP to a given destination AP is based on a further handover control parameter $\Delta$, which represents the difference between the RSSI value of the source AP and a minimum RSSI value that the given candidate destination AP should satisfy:

$$\Delta = \text{RSSI(source AP)} - \text{RSSI(candidate destination AP)} + b,$$

where RSSI(source AP) is the RSSI value of the source AP measured by the wireless connection quality detector 114, RSSI(candidate destination AP) is the minimum RSSI value that the given candidate destination AP should satisfy, and b is a specified constant (e.g. between 2 to 5 dBm), to prevent a ping-pong effect that can cause the electronic device 100 to handover between APs too frequently. The RSSI(candidate destination AP) value is used to specify that the destination AP should not have too low an RSSI (and thus too low a wireless connection quality), as compared to the RSSI of the source AP.

The parameters L (RSSI threshold) and $\Delta$ are examples of the handover control parameters 116 relating to controlling handover between APs that are used in the process of FIG. 2.

Note that the L and $\Delta$ parameters (or more specifically, values of the L and $\Delta$ parameters) can differ between different pairs of the source AP and candidate destination APs. A table in FIG. 3 shows examples of the handover control parameters employed between different pairs of source and destination APs. In the FIG. 3 table, S:1, S:2, and S:3 specify that the source is AP 1, AP 2, and AP 3, respectively. Similarly, in FIG. 3, D:1, D:2, and D:3 specify that the candidate destination APs are AP 1, AP 2, and AP 3, respectively. As indicated in the table of the FIG. 3 table, a handover cannot be performed between the same AP (as indicated by the diagonal entries with "N/A" in the FIG. 3 table).

In the FIG. 3 table, the handover control parameters for source AP 2 and candidate destination AP 1 (contained in the entry for S:2 and D:1) include L and $\Delta$. However, the handover control parameters for source AP 2 and candidate destination AP 3 (contained in the entry for S:2 and D:3) include L" and $-\Delta'$, which differ in values from the handover control parameters for AP pair {S:2 and D:1}.

The difference in the values of the handover control parameters can be due to differences in interference caused by an interference source depending upon which AP the electronic device 100 is currently connected to. For example, if the wireless communication component 106 is a WLAN transceiver, and the interference source 108 is an LTE transceiver, then certain WLAN channels are subjected to greater interference due to transmissions of the LTE transceiver than other WLAN channels. Thus, the handover control parameters used when the electronic device 100 is currently communicating over a WLAN channel subjected to greater interference by LTE transceiver transmissions can differ in value(s) from handover control parameters used when the electronic device 100 is currently communicating over another WLAN channel that is subjected to less interference from LTE transceiver transmissions.

More specifically, the parameter Δ can be a function of the combination of the source AP and the candidate destination AP, and can be represented as follows:

$$\Delta(S{:}i \rightarrow D{:}j) = RSSI(S{:}i) - RSSI(D{:}j) + b,$$

where i does not equal j, S:i represents source AP i, and D:j represents the candidate destination AP j. The threshold parameter L can also be expressed as a function of the combination of the source AP and the candidate destination AP: L(S:i→D:j).

In some specific examples, the interference mitigation logic 110 can trigger a handover from source AP i to candidate destination AP j if the following condition is satisfied:

$$RSSI(S{:}i) < L(S{:}i \rightarrow D{:}j) \text{ AND } (RSSI(S{:}i) - RSSI(D{:}j) > \Delta(S{:}i \rightarrow D{:}j)).$$

According to the foregoing, a handover is triggered by the interference mitigation logic if the RSSI of the source AP i is less than the threshold, L(S:i→D:j), and the difference between the RSSI of AP i and the RSSI of AP j, expressed as RSSI(S:i)–RSSI(D:j), is greater than Δ(S:i→D:j).

The values of the handover control parameters 116, such as those shown in FIG. 3, can be preconfigured at the electronic device 100, or alternatively, can be sent to the electronic device 100 by another entity, such as an AP or another control entity. In some implementations, the handover control parameters 116 can be stored in table form, such as according to the FIG. 3 example. Depending on which source AP the electronic device 100 is connected, the respective row of the table can be retrieved to use as handover control parameters to decide whether handover is to be performed to a candidate destination AP.

In alternative implementations, instead of storing the handover control parameters 116 in table form as in FIG. 3, the handover control parameters can be set depending on which source AP the electronic device 100 is connected to. For example, if the electronic device 100 is currently connected to AP 1, then the respective collection of handover control parameters (for the respective candidate destination APs) can be set, such as by the electronic device 100, the source AP, or another entity. However, if the electronic device 100 is currently connected to AP 2, then another respective collection of handover control parameters (for the respective candidate destination APs) can be set.

In additional implementations, values of the handover control parameters can be adjusted based on a transmit power of an electronic device. Different transmit powers of the electronic device can result in setting different values for the handover control parameters.

Different collections of handover control parameters can be provided (e.g. stored) at the electronic device 100 for respective different interference sources. For example, a first collection of handover control parameters can be provided for a first interference source, a second collection of handover control parameters can be provided for a second interference source, and so forth.

FIG. 4 is a flow diagram of a process performed by the interference mitigation logic 110 according to further implementations. Based on information of the monitored quality of a wireless connection provided by the wireless connection quality detector 114 and based on states of various components of the electronic device 100, the interference mitigation logic 110 is able to identify (at 402) the type of interference source from multiple types of interference sources (e.g. LTE transceiver, Bluetooth transceiver, HDMI cable connection, etc.). For example, if the LTE transceiver is presently actively transmitting, an indication of the actively transmitting status of the LTE transceiver can be provided to the interference mitigation logic 110, which can then make a determination that the interference source is likely the LTE transceiver, based on the actively transmitting status and possibly also based on whether statistics relating to the wireless connection is indicative of interference by the LTE transceiver.

In response to the identified interference source, the interference mitigation logic 110 selects (at 404) one of multiple collections of handover control parameters for respective different types of interference sources. The interference mitigation logic 110 then uses (at 406) the selected collection of handover control parameters to decide whether handover of the electronic device 100 from the source AP to a candidate destination AP should be performed.

As noted above, various logic (e.g. 110, 112, 114 in FIG. 1) can be implemented with machine-readable instructions. FIG. 5 shows the electronic device 100 that includes machine-readable instructions 502 (which can include the machine-readable instructions of any of the foregoing logic) that are executable on one or multiple processors 504. A processor can include a microprocessor, microcontroller, processor module or subsystem, programmable integrated circuit, programmable gate array, or another control or computing device.

The machine-readable instructions 502 can be stored in a non-transitory machine-readable storage medium (or storage media) 506. The storage medium (or storage media) 506 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of mitigating interference with wireless communications, comprising:

monitoring, by an electronic device, a quality of a first wireless connection between the electronic device and a first access point;

determining, by the electronic device based on the monitoring and a collection of parameters relating to controlling handover between access points, whether the electronic device should be handed over to a second access point from the first access point, wherein the parameters differ for different combinations of the first access point and candidate destination access points for handover of the electronic device from the first access point, wherein the collection of parameters includes threshold parameters relating to wireless connection quality thresholds usable for deciding whether the monitored quality of the first wireless connection should trigger a handover, and includes difference parameters specifying differences between a wireless connection quality of the first access point and respective minimum wireless connection qualities of the candidate destination access points, the difference parameters distinct from the threshold parameters, wherein the determining comprises determining that the electronic device is to be handed over to the second access point in response to detecting that the monitored quality of the first wireless connection is less than a first of the threshold parameters and exceeds a quality of a second wireless connection between the electronic device and the second access point by at least a value of a first of the difference parameters; and triggering, by the electronic device based on the determining, handover of the electronic device from the first access point to the second access point.

2. The method of claim 1, wherein the determining comprises:

using a first subset of the collection of parameters to decide whether the electronic device should be handed over from the first access point to the second access point, the first subset including the first threshold parameter and the first difference parameter; and using a second subset of the collection of parameters to decide whether the electronic device should be handed over from the first access point to a third access point, the second subset including a second threshold parameter of the threshold parameters, and a second difference parameter of the difference parameters, wherein the first subset of parameters differs from the second subset of parameters.

3. The method of claim 1, further comprising setting the collection of parameters to use depending upon an access point that the electronic device is currently connected to, wherein different collections of parameters are set for different access points that the electronic device is currently connected to.

4. The method of claim 1, wherein monitoring the quality of the first wireless connection comprises monitoring the quality of one or both of a downlink and an uplink between the electronic device and the first access point.

5. The method of claim 1, wherein monitoring the quality of the first wireless connection comprises monitoring a wireless connection quality indicator selected from among a received signal strength indicator (RSSI), a number of retries, and a data rate.

6. The method of claim 1, wherein the handover from the first access point to the second access point is to mitigate interference to wireless communications over the first wireless connection caused by an interference source.

7. The method of claim 6, wherein the interference source includes one or more of a wireless communication component and a non-wireless communication component.

8. The method of claim 1, wherein the handover from the first access point to the second access point is to mitigate interference to wireless communications over the first wireless connection caused by one or more of a plurality of types of interference sources.

9. The method of claim 8, further comprising:

identifying, by the electronic device, which of the plurality of types of interference sources is interfering with the wireless communications; and selecting, by the electronic device based on the identifying, the collection of parameters from among a plurality of collections of parameters, wherein the plurality of collections of parameters are provided for the respective plurality of types of interference sources.

10. The method of claim 1, further comprising varying values of the parameters in the collection based on a transmit power of the electronic device.

11. An electronic device comprising:

a storage medium to store a collection of parameters relating to controlling handover between access points of a wireless network; and at least one processor configured to:

monitor a quality of a first wireless connection between the electronic device and a first of the access points;

determine, based on the monitoring and the collection of parameters, whether the electronic device should be handed over to a second access point from the first access point, wherein the parameters differ for different combinations of the first access point and candidate destination access points for handover of the electronic device from the first access point, wherein the parameters for each combination of the first access point and a respective candidate destination access point include:

a respective wireless connection quality threshold usable for deciding whether the monitored quality of the first wireless connection should trigger a handover from the first access point to the respective candidate destination access point, and a difference parameter specifying a difference between a wireless connection quality of the first access point and a minimum wireless connection quality of the respective candidate destination access point, wherein the determining comprises determining that the electronic device is to be handed over to the second access point in response to detecting that the monitored quality of the first wireless connection is less than a first of the wireless connection quality thresholds and exceeds a quality of a second wireless connection between the electronic device and the second access point by at least a value of a first of the difference parameters; and trigger, based on the determining, handover of the electronic device from the first access point to the second access point.

12. The electronic device of claim 11, further comprising:
a first wireless communication component to communicate over the first wireless connection between the electronic device and the first access point; and
a second wireless communication component that is a potential interference source of wireless communications by the first wireless component over the first wireless connection.

13. The electronic device of claim 12, further comprising:
a non-wireless communication component that is a potential interference source of wireless communications by the first wireless component over the first wireless connection.

14. The electronic device of claim 11, wherein the parameters for a first combination of the first access point and a first candidate destination access point differ in value from the parameters for a second combination of the first access point and a second candidate destination access point.

15. The electronic device of claim 11, wherein the handover from the first access point to the second access point is to mitigate interference to wireless communications over the first wireless connection caused by one or more of a plurality of types of interference sources.

16. The electronic device of claim 15, wherein the at least one processor is configured to further:
identify which of the plurality of types of interference sources is interfering with the wireless communications; and
select, based on the identifying, the collection of parameters from among a plurality of collections of parameters, wherein the plurality of collections of parameters are provided for the respective plurality of types of interference sources.

17. A non-transitory storage medium storing instructions that upon execution cause an electronic device to:
monitor a quality of a first wireless connection between the electronic device and a first access point; and
determine, based on the monitoring and a collection of parameters relating to controlling handover between access points, whether the electronic device should be handed over to a second access point from the first access point, wherein the parameters differ for different combinations of the first access point and candidate destination access points for handover of the electronic device from the first access point, wherein the collection of parameters includes threshold parameters relating to wireless connection quality thresholds usable for deciding whether the monitored quality of the first wireless connection should trigger a handover, and includes difference parameters specifying differences between a wireless connection quality of the first access point and respective minimum wireless connection qualities of the candidate destination access points, the difference parameters distinct from the threshold parameters, wherein the determining comprises determining that the electronic device is to be handed over to the second access point in response to detecting that the monitored quality of the first wireless connection is less than a first of the threshold parameters and exceeds a quality of a second wireless connection between the electronic device and the second access point by at least a value of a first of the difference parameters; and
trigger, based on the determining, handover of the electronic device from the first access point to the second access point.

* * * * *